(12) United States Patent
Frederick

(10) Patent No.: US 6,428,064 B1
(45) Date of Patent: Aug. 6, 2002

(54) ENERGY ABSORBING BUMPER

(75) Inventor: Gregory Stanley Frederick, Sterling Hts., MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,280

(22) Filed: Mar. 13, 2001

(51) Int. Cl.[7] ............................................. B60R 19/03
(52) U.S. Cl. .......................... 293/120; 293/121; 293/88
(58) Field of Search ................... 293/120, 132, 293/110, 103, 121, 133, 102, 122; 296/189

(56) References Cited

U.S. PATENT DOCUMENTS

| | | | | |
|---|---|---|---|---|
| 3,844,544 A | * | 10/1974 | Keilholz ....................... | 293/70 |
| 3,877,741 A | * | 4/1975 | Wilfert et al. ................. | 293/89 |
| 3,912,295 A | * | 10/1975 | Eggert, Jr. .................... | 293/63 |
| 3,938,840 A | * | 2/1976 | Haase et al. ................... | 293/88 |
| 4,270,787 A | * | 6/1981 | Savell .......................... | 293/121 |
| 4,328,986 A | * | 5/1982 | Weller et al. ................. | 293/120 |
| 4,348,042 A | * | 9/1982 | Scrivo ......................... | 293/120 |
| 4,998,761 A | * | 3/1991 | Bayer et al. .................. | 293/121 |
| 5,078,439 A | * | 1/1992 | Terada et al. ................. | 293/121 |
| 5,106,137 A | * | 4/1992 | Curtis .......................... | 293/109 |
| 5,123,688 A | * | 6/1992 | Takado et al. ............... | 293/120 |
| 5,201,912 A | * | 4/1993 | Terada et al. ................. | 293/120 |
| 5,290,078 A | * | 3/1994 | Bayer et al. .................. | 293/120 |
| 6,179,355 B1 | * | 1/2001 | Chou et al. ................... | 293/120 |
| 6,209,934 B1 | * | 4/2001 | Sakuma et al. .............. | 293/120 |
| 2001/0017473 A1 | * | 8/2001 | Yamamoto ................... | 293/122 |

* cited by examiner

Primary Examiner—Ken Patel
(74) Attorney, Agent, or Firm—Gigette M. Bejin

(57) ABSTRACT

An energy absorbing bumper assembly is provided, including a tube member and a first energy absorbing element positioned within the tube member, including at least one flange portion that absorbs collision energy by deflecting vertically during collision.

11 Claims, 3 Drawing Sheets

ENERGY ABSORBING BUMPER

TECHNICAL FIELD

The present invention relates generally to an energy absorbing bumper and more particularly to an energy absorbing bumper for low speed impact.

BACKGROUND

Bumpers are used on vehicles and stationary guards for absorbing shock and impact from collisions. They are used both to prevent injury to persons as well as damage to property. The range of known bumper designs can vary from simple polymer moldings to complex hydraulic mechanisms In a related fashion, the cost of bumpers may also vary from relatively inexpensive to relatively expensive.

In almost all bumper designs, be they simple, complex, inexpensive, or costly, the primary functionality resides in absorbing collision energy in order to prevent or minimize damage to persons and/or property. A bumper design that retains these energy absorbing characteristics while remaining relatively inexpensive and having simplicity of construct would be highly desirable in a variety of applications.

One such application is in automotive vehicles bumper systems. These systems are typically designed to absorb the energy of slow speed impacts in order to prevent damage to the vehicle body or vehicle occupants Often, however, damage to such bumper systems during collisions can require replacement of the bumper. A bumper system that combines relative ease of construction, reduced construction costs, and adequate energy absorption could help reduce the replacement cost of such bumpers. A decrease in initial construction and replacement costs can lead to improved customer satisfaction and increased profitability.

It would, therefore, be highly desirable to have an energy absorbing bumper system with reduced manufacturing costs, reduced manufacturing requirements, and improved energy absorbing characteristics.

SUMMARY OF THE INVENTION

It is, therefore, an object of the present invention to provide an energy absorbing bumper with relatively low manufacturing and assembly costs and improved energy absorbing characteristics.

In accordance with the object of the present invention, an energy absorbing bumper assembly is provided, The energy absorbing bumper includes a tube member and a first energy absorbing element positioned within the tube member The first energy absorbing element includes at least one flange portion allowing impact energy to be dissipated through vertical movement of the flange member in addition to energy absorbed by the horizontal displacement of the first energy absorbing element.

Other objects and features of the present invention will become apparent when viewed in light of the detailed description of the preferred embodiment when taken in conjunction with the attached drawings and appended claims.

DESCRIPTION OF THE PREFERRED EMBODIMENT(s)

Figure 1:
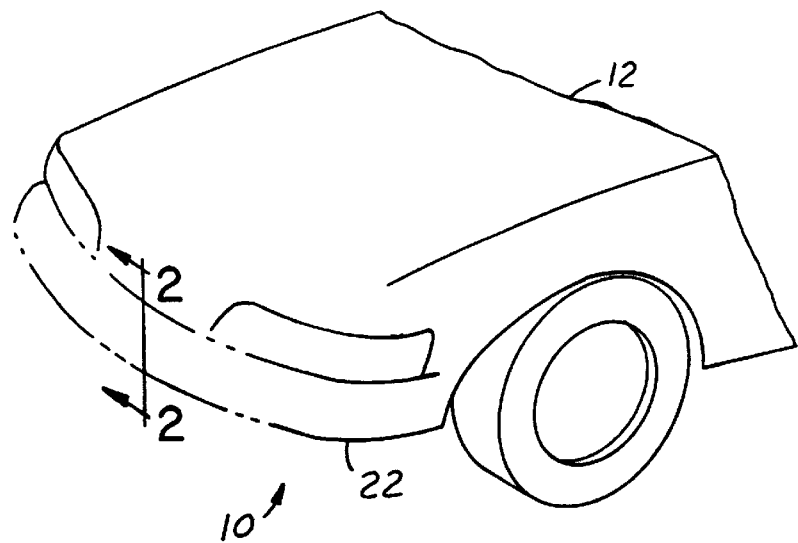
FIG. 1 is an illustration of an embodiment of an energy absorbing bumper assembly in accordance with the present invention.

Referring now to FIG. 1 which is an illustration of an energy absorbing bumper system in accordance with the present invention. The energy absorbing bumper assembly 10 is illustrated mounted on an automobile 12. Although the energy absorbing bumper assembly 10 is described in relation to use on an automobile 12, it should be understood that the energy absorbing bumper mechanism 10 may be used in a wide variety of applications, including non-automotive applications Referring now to FIG. 2, which is a cross-sectional illustration of the energy absorbing bumper assembly 10 as shown in FIG. 1, the cross-section being taken along the line 2—2 in the direction of the arrows. The energy absorbing bumper assembly 10 includes a tube member 14. Although the tube member 14 is illustrated as a typical box beam, it should be understood that a wide variety of shapes and configurations of the tube member 14 are contemplated by the present invention. A first energy absorbing element 16 is positioned within the tube member 14. The first energy absorbing member 16 includes at least one flange portion 18 capable of dispersing collision energy through vertical displacement within tube member 14.

The energy absorbing bumper assembly 10 may additionally include a secondary energy absorbing element 20, such as a foam energy absorber. Foam energy absorbers, often low density foam, are well known in the prior art In addition, the energy absorbing bumper assembly lQ may include a bumper cover 22 (facia)

It should be understood, however, that alternate embodiments may not utilize a secondary energy absorbing element 20 or may utilize multiple secondary energy absorber elements 20. In a similar fashion, some embodiments may not utilize a bumper cover 22.

Figure 2:
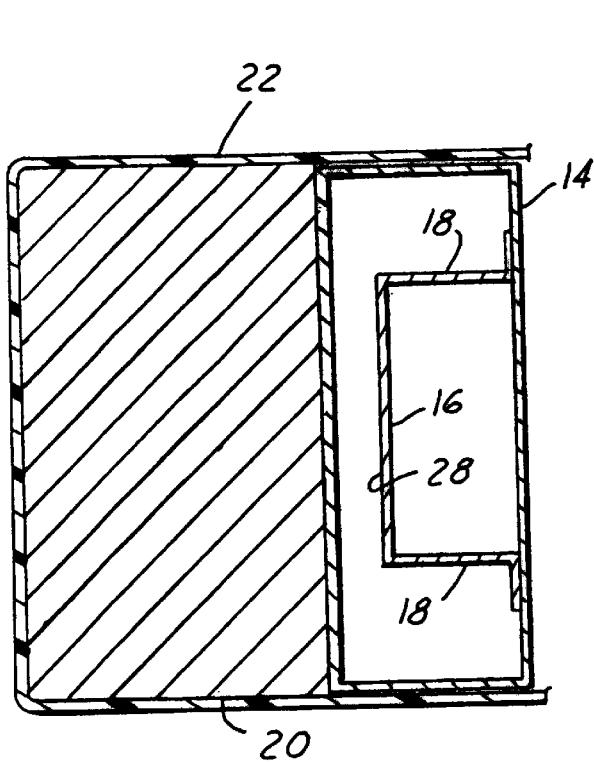
FIG. 2 is a cross-sectional illustration of an embodiment of the energy absorbing bumper assembly as shown in FIG. 1, the cross-section being taken along line 2—2 in the direction of the arrows.
Figure 3:
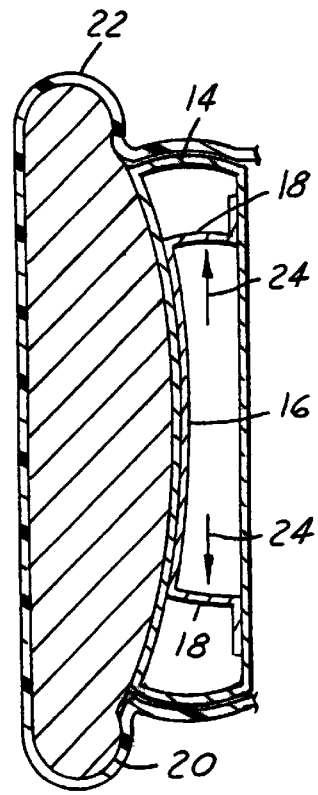
FIG. 3 is a cross-sectional illustration of the embodiment of an energy absorbing bumper assembly as shown in FIG. 2 illustrating the energy absorbing bumper's performance during collision.

Referring now to FIG. 3, which is a cross-sectional view of the energy absorbing bumper assembly 10 as shown in FIG. 2 shown reacting to a collision. The energy absorbing bumper assembly 10 dissipates energy from the collision in a plurality of ways. Some energy is dissipated through the horizontal deformation of the tube member 14. Additional collision energy is dissipated by the horizontal deformation of the energy absorbing member 16. The vertical deformation of the flange element(s) 18 also reduces and dissipates the collision energy. Finally, additional energy may be dissipated through any additional energy dissipating elements, such as the foam energy absorber 20.

Figure 8:
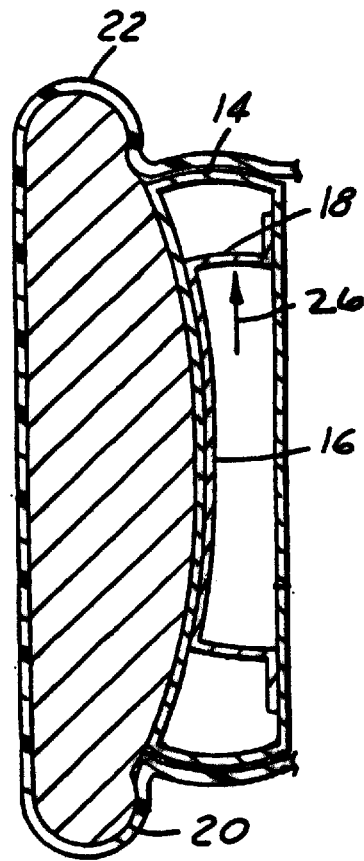
FIG. 8 is a cross-sectional illustration of an embodiment at an energy absorbing bumper assembly in accordance with the present invention, the embodiment illustrating only one flange element displacing during collision.

The first energy absorbing element 16 is illustrated in FIG. 3 with two flange elements 18 that displace in opposite vertical directions 24 when absorbing impact energy. It could be understood, however, that in alternate embodiments, the two flange elements 18 may move in a vertical direction towards each other, may both move in the same vertical direction 25 (see FIG. 2.), or only one flange element may move 26 (see FIG. 8). The general shape of both the energy absorbing element 16 and the flange element (s) 18 may be modified into a variety of configurations.

Figure 4:
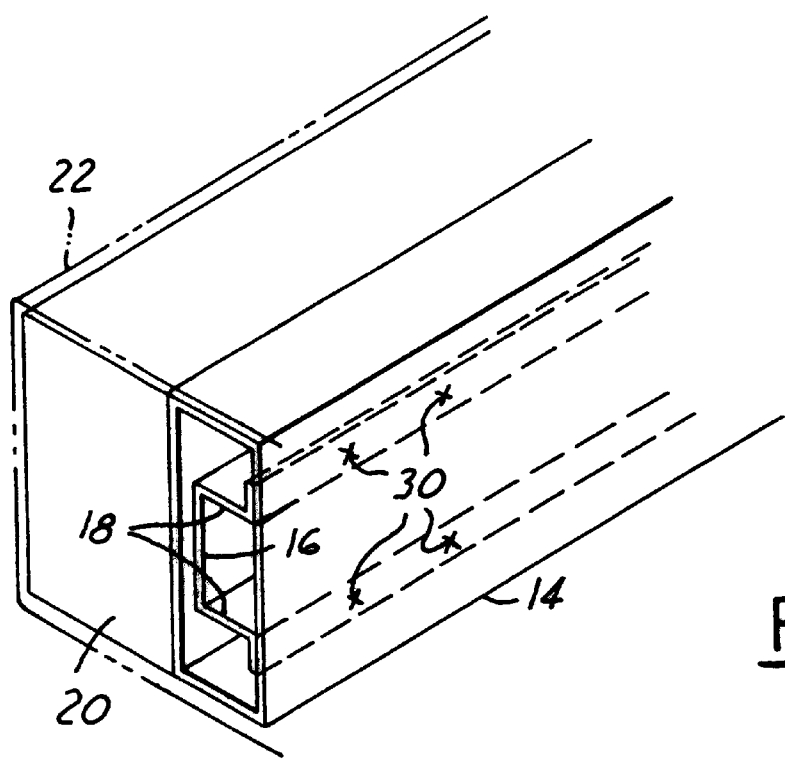
FIG. 4 is an illustration of the embodiment of the energy absorbing bumper assembly in accordance with the present invention.
Figure 5:
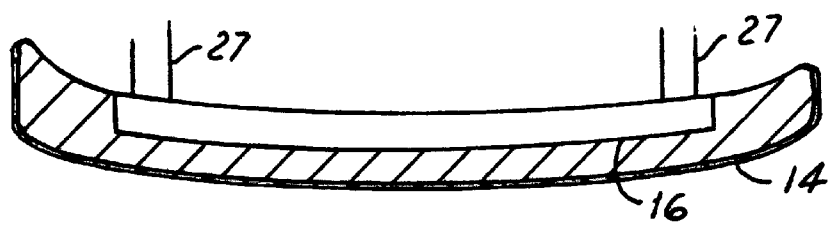
FIG. 5 is a top view of the embodiment of an energy absorbing bumper assembly in accordance with the present invention.
Figure 6:
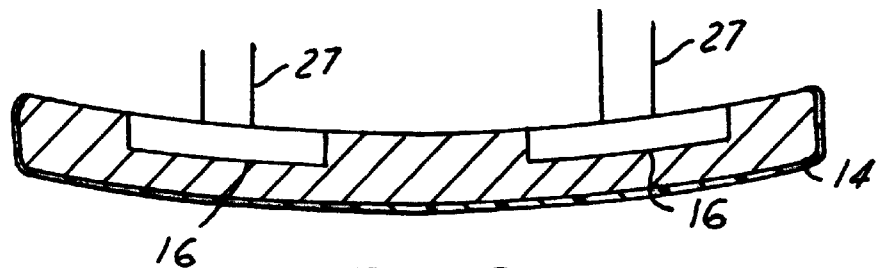
FIG. 6 is a top view of an alternate embodiment of an energy absorption bumper assembly in accordance with the present inventions Kindly add FIG. 7 as follows.
Figure 7:
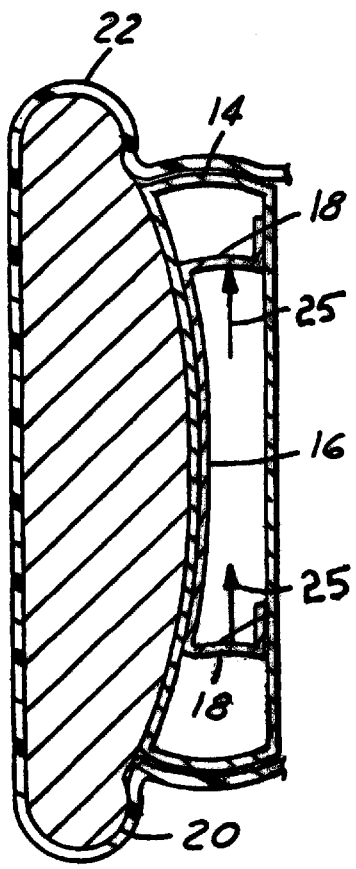
FIG. 7 is a cross-sectional illustration of an embodiment at an energy absorbing bumper assembly in accordance with the present invention, the embodiment illustrating the flange elements displacing in the same direction during collision; and embodiment, connection elements 30, such as spot or tack welds, are used to connect the flange elements 18 are to the tube member 14 in only a few locations (see FIG. 4) allowing the majority of flange elements 18 (i.e. portions of the flange elements not in the immediate area of the welds) 13 to displace vertically during impact. In another embodiment, the connection elements 30 may be low strength welds, adhesives, or other bonds utilized to attach flange elements 18 to the tube member 14 such that during collision, these low strength bonds break free and allow vertical displacement of the flange elements 18. In still another embodiment, the connection elements 30 may be mechanical fasteners such as bolts, clips, or other devices used to attach flange elements 18 to the tube member 14. In one final alternate embodiment, the face 28 of the first energy absorbing element 16 may be affixed to the tube member 14 and the flange element(s) 18 may only contact the tube member 14 during collision.

In addition to the shapes and configurations of the first energy absorbing element 16, a variety of configurations are contemplated to attach the energy absorbing element 16 to the tube member 14. In one embodiment one flange element 19 is permanently affixed to the tube member 14 allowing the opposing flange element 18 to displace vertically during collision (see FIG. 8).In another embodiment, connection elements 30, such as spot or tack welds, are used to connect the flange elements 18 are to the tube member 14 on only a few locations (see FIG. 4) allowing the majority of flange elements 18 (i.e. portions of the flange elements not in the immediate area of the welds) to displace vertically during impact. In another embodiment, the connection elements 30 may be low strength welds, adhesives, or other bonds utilized to attach flange elements 18 to the tube member 14 such that during collision , these low strengthebonds break free and allowvertical displacement of the flange elements 18. In still another embodiment, the connection elements 30 may be mechanical fastener such as bolts, slips, or other devices used to attach flange elements 18 to the tube member 14. In one final alternate embodiment, the face 28 of the first energy absorbing element 16 may be affixed to the tube member 14 and the flange elements(s) 18 may only contact the tube member 14 during collision.

In addition to the shapes and configurations of the first energy absorbing element 16, a variety of configurations are contemplated to attach the energy absorbing element 16 to the tube member 14. In one embodiment (not shown) one flange element 18 is permanently affixed to the tube member 14 allowing the opposing flange element 18 to displace vertically during collision. In another embodiment, the flange elements 18 are spot welded to the tube member 14 in only a few locations 30 (see FIG. 4) allowing the majority of flange elements 18 (i.e. portions of the flange elements not in the immediate area of the welds) to displace vertically during impact. In another embodiment (not shown) low strength welds or adhesives may be utilized to attach flange elements 18 to the tube member 14 such that during collision, these low strength attachments break free and allow vertical displacement of the flange elements 18. In still another embodiment, mechanical fasteners (not shown) such as bolts, clips, or other devices may be used to attach flange elements 18 to the tube member 14. In one final alternate embodiment, the face 28 of the first energy absorbing element 16 may be affixed to the tube member 14 and the flange element(s) 18 may only contact the tube member 14 during collision.

Finally, it is contemplated that the first energy absorbing element 16 may be utilized without the tube member 14. In these embodiments (not shown) the first energy absorbing element 16 may be used in conjunction with other energy absorbing elements 20, or may be used alone. The first energy absorbing element 16 may be mounted to any available surface in a fashion similar to the described mounting on the tube member 14.

While particular embodiments of the invention have been shown and described, numerous variations and alternative embodiments will occur to those skilled in the art. Accordingly, it is intended that the invention be limited only in terms of the appended claims.

What is claimed is:

1. An energy absorbing bumper comprising:
   a tube member; and
   at least one first energy absorbing element positioned within said tube member, said at least one first energy absorbing element including at least one flange portion absorbing energy through vertical displacement during collision.

2. An energy absorbing bumper assembly as described in claim 1 further comprising a secondary energy absorbing element in communication with said tube element.

3. An energy absorbing bumper assembly as described in claim 2 wherein said secondary energy absorbing element comprises low density foam.

4. An energy absorbing bumper assembly as described in claim 1 further comprising:
   a bumper cover.

5. An energy absorbing bumper assembly as described in claim 1 wherein said at least one flange portion comprises two flange portions.

6. An energy absorbing bumper assembly as described in claim 5 wherein said flange elements move in opposite directions during impact.

7. An energy absorbing bumper assembly as described in claim 5 wherein said flange elements move in the same direction during impact.

8. An energy absorbing bumper assembly as described in claim 1 wherein said at least one first energy absorbing element is attached to said tube member using bonds that will break during collision.

9. An energy absorbing bumper assembly as described in claim 1 wherein said at least one first energy absorbing element is attached to said tube element using tack welds.

10. An energy absorbing bumper assembly as described in claim 1 wherein said at least one first absorbing element is attached to said tube element using mechanical fasteners.

11. An energy absorbing bumper assembly as described in claim 5 wherein one of said flange elements is affixed to said tube member, and the opposite flange element is free to displace vertically.

* * * * *